US007555430B2

(12) United States Patent
Murveit et al.

(10) Patent No.: US 7,555,430 B2
(45) Date of Patent: Jun. 30, 2009

(54) SELECTIVE MULTI-PASS SPEECH RECOGNITION SYSTEM AND METHOD

(75) Inventors: Hy Murveit, Portola Valley, CA (US); Ashvin Kannan, Redwood City, CA (US); Ben Shahshahani, Capitola, CA (US); Chris Leggetter, Mountain View, CA (US); Katherine Knill, Mountain View, CA (US)

(73) Assignee: Nuance Communications, Menlo Park, CA (US)

( * ) Notice: Subject to any disclaimer, the term of this patent is extended or adjusted under 35 U.S.C. 154(b) by 38 days.

(21) Appl. No.: 11/398,402

(22) Filed: Apr. 4, 2006

(65) Prior Publication Data

US 2006/0184360 A1    Aug. 17, 2006

Related U.S. Application Data

(62) Division of application No. 09/294,847, filed on Apr. 20, 1999, now Pat. No. 7,058,573.

(51) Int. Cl.
*G10L 11/06* (2006.01)
(52) U.S. Cl. .................... 704/214; 704/215
(58) Field of Classification Search ............. 704/215, 704/210, 214
See application file for complete search history.

(56) References Cited

U.S. PATENT DOCUMENTS

| | | | | |
|---|---|---|---|---|
| 4,481,593 | A | * | 11/1984 | Bahler .................. 704/253 |
| 4,489,434 | A | | 12/1984 | Moshier .................. 381/43 |
| 4,590,604 | A | | 5/1986 | Feilchenfeld ............ 381/42 |
| 4,866,778 | A | | 9/1989 | Baker ..................... 381/43 |
| 4,903,305 | A | * | 2/1990 | Gillick et al. ............ 704/245 |
| 5,127,055 | A | | 6/1992 | Larkey .................... 381/43 |
| 5,208,897 | A | | 5/1993 | Hutchins ................. 395/2 |
| 5,239,586 | A | | 8/1993 | Marui ..................... 381/47 |
| 5,293,452 | A | | 3/1994 | Picone et al. ............ 395/2.59 |
| 5,418,717 | A | | 5/1995 | Su et al. ................. 704/9 |
| 5,488,652 | A | | 1/1996 | Bielby et al. ............ 379/88 |
| 5,515,475 | A | * | 5/1996 | Gupta et al. ............. 704/242 |
| 5,526,463 | A | | 6/1996 | Gillick et al. ............ 395/2.6 |
| 5,528,731 | A | | 6/1996 | Sachs et al. ............. 395/2.55 |
| 5,568,540 | A | | 10/1996 | Greco et al. ............. 379/88.25 |

(Continued)

FOREIGN PATENT DOCUMENTS

JP        10079785        3/1998

*Primary Examiner*—Michael N Opsasnick
(74) *Attorney, Agent, or Firm*—Michael A. Glenn; Glenn Patent Group (57) ABSTRACT

Method and apparatus for multi-pass speech recognition. An input device receives spoken input. A processor performs a first pass speech recognition technique on the spoken input and forms first pass results. The first pass results include a number of alternative speech expressions, each having an assigned score related to the certainty that the corresponding expression correctly matches the spoken input. The processor selectively performs a second pass speech recognition technique on the spoken input according to the first pass results. Preferably, the second pass attempts to correctly match the spoken input to only those expressions which were identified during the first pass. Otherwise, if one of the expressions identified by the first pass is assigned a score higher than a predetermined threshold (e.g., 95%), the second pass is not performed. Because the second pass is performed only when necessary, the invention recognizes speech with a faster average speed for a given accuracy in comparison to prior systems.

12 Claims, 6 Drawing Sheets

U.S. PATENT DOCUMENTS

| | | | | |
|---|---|---|---|---|
| 5,590,242 A | 12/1996 | Juang et al. | ................ | 395/2.54 |
| 5,617,486 A | 4/1997 | Chow et al. | ................ | 382/181 |
| 5,640,490 A * | 6/1997 | Hansen et al. | ............ | 704/254 |
| 5,651,054 A | 7/1997 | Dunn et al. | ................... | 379/67 |
| 5,717,743 A | 2/1998 | McMahan et al. | .......... | 379/188 |
| 5,742,905 A | 4/1998 | Pepe et al. | ................ | 455/461 |
| 5,778,338 A | 7/1998 | Jacobs et al. | ............... | 704/223 |
| 5,794,192 A | 8/1998 | Zhao | ......................... | 704/244 |
| 5,799,065 A * | 8/1998 | Junqua et al. | ........... | 379/88.03 |
| 5,822,405 A | 10/1998 | Astarabadi | .................. | 379/88 |
| 5,822,730 A * | 10/1998 | Roth et al. | ................ | 704/255 |
| 5,842,161 A | 11/1998 | Cohrs et al. | ............... | 704/251 |
| 5,848,130 A | 12/1998 | Rochkind | ................... | 379/67 |
| 5,854,999 A | 12/1998 | Hirayama | ................. | 704/226 |
| 5,873,062 A * | 2/1999 | Hansen et al. | ............. | 704/254 |
| 5,937,384 A | 8/1999 | Huang et al. | ............... | 704/256 |
| 5,937,557 A | 8/1999 | Bowker et al. | ............ | 42/70.01 |
| 5,946,653 A * | 8/1999 | Campbell et al. | .......... | 704/243 |
| 5,953,701 A | 9/1999 | Neti et al. | ................... | 704/254 |
| 5,960,384 A | 9/1999 | Brash | ........................... | 704/9 |
| 6,018,708 A * | 1/2000 | Dahan et al. | ................ | 704/244 |
| 6,044,346 A | 3/2000 | Ali et al. | ..................... | 704/270 |
| 6,044,347 A | 3/2000 | Abella et al. | ............... | 704/272 |
| 6,058,363 A | 5/2000 | Ramalingam | .............. | 704/251 |
| 6,070,140 A | 5/2000 | Tran | ........................... | 704/275 |
| 6,092,045 A * | 7/2000 | Stubley et al. | ............. | 704/254 |
| 6,098,040 A * | 8/2000 | Petroni et al. | .............. | 704/234 |
| 6,151,571 A | 11/2000 | Pertrushin | .................. | 704/209 |
| 6,185,535 B1 | 2/2001 | Hedin et al. | ................ | 704/270 |
| 6,272,455 B1 | 8/2001 | Hoshen et al. | ................ | 704/1 |
| 6,275,801 B1 | 8/2001 | Novak et al. | ............... | 704/252 |
| 6,275,806 B1 | 8/2001 | Pertrushin | .................. | 704/272 |
| 6,327,343 B1 | 12/2001 | Epstein et al. | .......... | 379/88.01 |
| 6,334,103 B1 | 12/2001 | Surace et al. | .............. | 704/257 |
| 6,363,348 B1 | 3/2002 | Besling et al. | ............ | 704/270.1 |
| 6,574,597 B1 | 6/2003 | Mohri et al. | ............... | 704/251 |
| 6,732,072 B1 | 5/2004 | Pearce et al. | ............... | 704/231 |

* cited by examiner

SELECTIVE MULTI-PASS SPEECH RECOGNITION SYSTEM AND METHOD

This Patent Application is a divisional application of U.S. patent application Ser. No. 09/294,847, filed on Apr. 20, 1999, now U.S. Pat. No. 7,058,573 and entitled "Adaptive Multi-Pass Speech Recognition System." The application Ser. No. 09/294,847, filed on Apr. 20, 1999, now U.S. Pat. No. 7,058,573 and entitled "Adaptive Multi-Pass Speech Recognition System;" is hereby incorporated by reference.

FIELD OF THE INVENTION

The present invention relates to the field of speech recognition. More particularly, the present invention relates to the field of multi-pass speech recognition. The system selectively performs single, double or multi-pass speech recognition to achieve a desired confidence in the speech recognition process.

BACKGROUND OF THE INVENTION

Speech recognition systems are known which permit a user to interface with a computer system using spoken language. A speech recognition system receives spoken input from the user, interprets the input, and then translates the input into a form that the computer system understands. More particularly, spoken input in the form of an analog waveform is digitally sampled. The digital samples are then processed by the speech recognition system according to a speech recognition algorithm. Speech recognition systems typically recognize and identify words or utterances of the spoken input by comparison to previously obtained templates of words or utterances or by comparison to a previously obtained acoustic model of a person who is speaking. The templates and acoustic model are typically generated based upon samples of speech.

An example of a known speech recognition technique is word-level template matching. During word-level template matching, the spoken input is compared to pre-stored templates which represent various words. A template which most closely matches the spoken input is selected as the output. Another example of a known speech recognition technique is acoustic-phonetic recognition. According to acoustic-phonetic recognition, the spoken input is segmented and identified according to basic units of speech sound (phonemes). The results of segmentation and identification are then compared to a pre-stored vocabulary of words. The word or words which most closely match the spoken input are selected as the output.

Yet another example of a known speech recognition technique is stochastic speech recognition. According to stochastic speech recognition, the spoken input is converted into a series of parameter values which are compared to pre-stored models. For example, the pre-stored models can be Hidden Markov Models (HMMs) that use Gaussian Mixture Models (GMMs) to model short-term acoustic observation probabilities. The GMMs and HMMs are obtained for phonemes by taking samples of spoken words or sentences and then representing the speech as parameter values which take into account statistical variation between different samples of the same phoneme. Probabilistic analysis is utilized to obtain a best match for the spoken input. Known algorithms for probabilistic analysis are the Baum-Welch maximum likelihood algorithm and the Viterbi algorithm.

A typical characteristic of such known speech recognition systems is contention between processing time and recognition accuracy. Thus, a speech recognition system which is pre-configured for an acceptable level of accuracy is often accompanied by unacceptable delay or processing power requirements to recognize speech, whereas, a speech recognition system which is pre-configured for an acceptable speed of recognition often exhibits unacceptable error levels.

Figure 1:
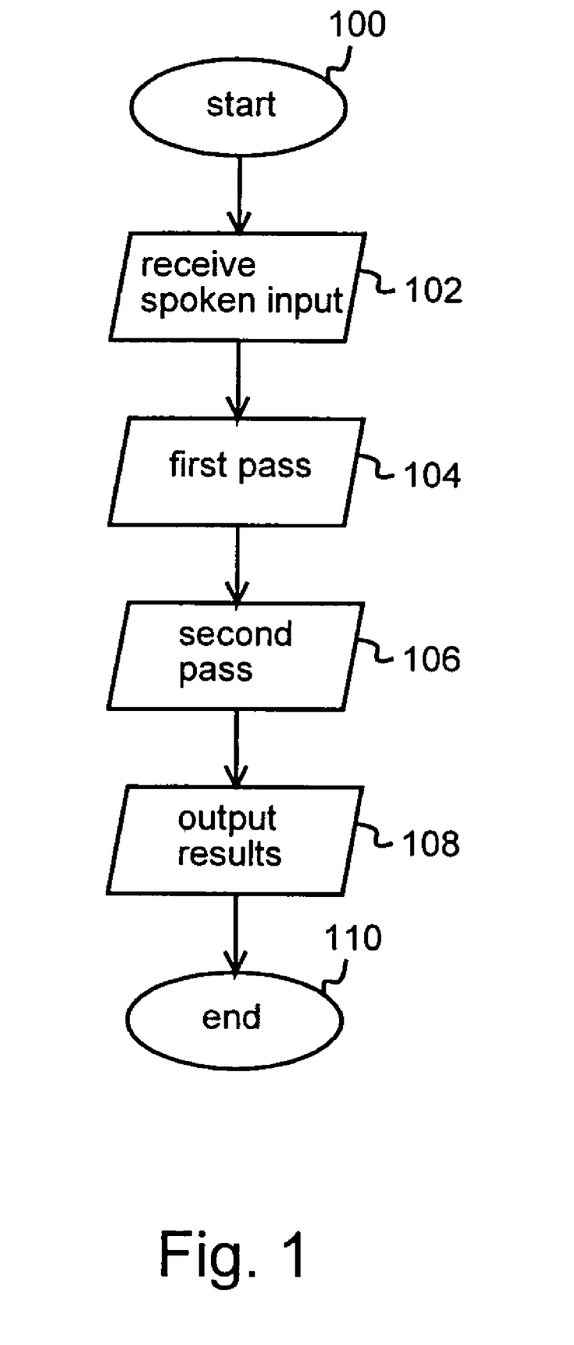
FIG. 1 illustrates flow diagram for a multi-pass speech recognition system according to the prior art.

A contemplated solution to this contention between recognition speed and accuracy has been two-pass speech recognition. A two-pass speech recognition system processes spoken input according to two speech recognition algorithms in succession. FIG. 1 illustrates flow diagram for a two-pass speech recognition system according to the prior art. Program flow begins in a start state 100. Then program flow moves to a state 102 where spoken input is received. During a first pass in a state 104, spoken input is processed according to a high speed, but relatively low accuracy, speech recognition technique. This first pass produces several alternative matches for the spoken input. During a second pass in a state 104, a low speed, but relatively high accuracy, speech recognition technique is utilized to select one of the alternatives produced by the first pass. The results are outputted in a state 108 and, then, program flow terminates in a state 110. Because the second pass performed in the state 104 operates on a limited number of alternatives, the second pass was not expected to unduly delay or require undue processing power to perform the speech recognition process. In practice, however, for a given accuracy, the total processing time required by such two-pass systems tends to be longer than desired.

Similarly, U.S. Pat. No. 5,515,475, issued to Gupta et al., describes a two-pass speech recognition method in which a first pass is performed and, then, a second pass is performed. For a given accuracy, the total processing time required by the two passes also tends to be longer that desired.

Therefore, what is needed is a technique for increasing recognition speed while maintaining a high degree of recognition accuracy in a speech recognition system.

SUMMARY OF THE INVENTION

The invention is a method and apparatus for an improved multi-pass speech recognition system. The system includes an input device coupled to a source of spoken input for receiving the spoken input. A processor coupled to the input device performs a first pass speech recognition technique on the spoken input and forms first pass results. The first pass results can include a number of alternative speech expressions, each having an assigned score representative of the certainty that the corresponding expression correctly matches the spoken input. As an alternate to returning such a list, the first pass returns a graph that represents a number of alternative speech expressions, and this graph could weighed by scores, such as probabilities or certainties, and/or language model probabilities or the scores could be computable given the graph and recognition models. In the preferred embodiment, scores for alternative expressions and differences between such scores are utilized to determine whether to perform another speech recognition pass.

As an example using probabilities, assuming the spoken input is the word, "Boston", the results of the first pass could be a certainty of fifty-five percent (55%) assigned to the expression: "Austin"; a certainty of forty percent (40%) assigned to the alternative expression: "Boston"; and a certainty of five percent (5%) assigned to some other expression or expressions. The processor selectively performs a second pass speech recognition technique on the spoken input according to the first pass results. Because in the example, the results of the first pass are insufficient to correctly identify the spoken input, a second pass speech recognition is performed. In the preferred embodiment, the second pass speech recognizing technique attempts to correctly match the spoken input to only those expressions which were identified during the first pass as likely candidates. Otherwise, if one of the expressions identified by the first pass is assigned a certainty that is higher than a predetermined threshold (e.g., 95%), a second pass is not performed.

Preferably, the first pass is performed by a simpler speech recognition technique which narrows the possibilities for expressions which match the spoken input, while the second pass is performed only when necessary and by a more complex speech recognition technique which operates on only the narrowed possibilities. Because the second pass is performed only when necessary to achieve a desired accuracy, the speech recognition system in accordance with the invention recognizes speech with a faster average speed for the desired accuracy in comparison to prior systems.

In a preferred embodiment, the first pass results identify a characteristic of the spoken input. Thereafter, it is determined whether to run a second pass. If a second pass is run, the second pass speech recognition technique is selected taking into account the results of the first pass. For example, the characteristic of the spoken input can be the gender of a speaker of the spoken input or a type of telephone channel the speaker is calling from. In which case, the plurality of speech recognition techniques includes one specific to female speakers, one specific to male speakers and one specific to callers via a hands-free telephone. The most appropriate of these speech recognition techniques is selected for the second pass. However, if the first pass is unsuccessful at identifying the characteristic of the spoken input, then multiple ones of the plurality of speech recognition techniques can be selected for the second pass and the their results combined.

The first pass can recognize words and their phonetic alignments and, then, each second pass technique is utilized to perform an additional pass on a same selected portion of the spoken input based upon the word alignments. The second pass recognition technique which obtains a highest score for the selected portion is then utilized to perform a second pass upon the entire spoken input.

According to the-above described aspects of the present invention, speech recognition processing capability is selectively allocated as needed. In comparison to prior systems, the invention reduces the average time taken to recognize spoken input while maintaining a high degree of accuracy.

DETAILED DESCRIPTION OF A PREFERRED EMBODIMENT

Figure 2:
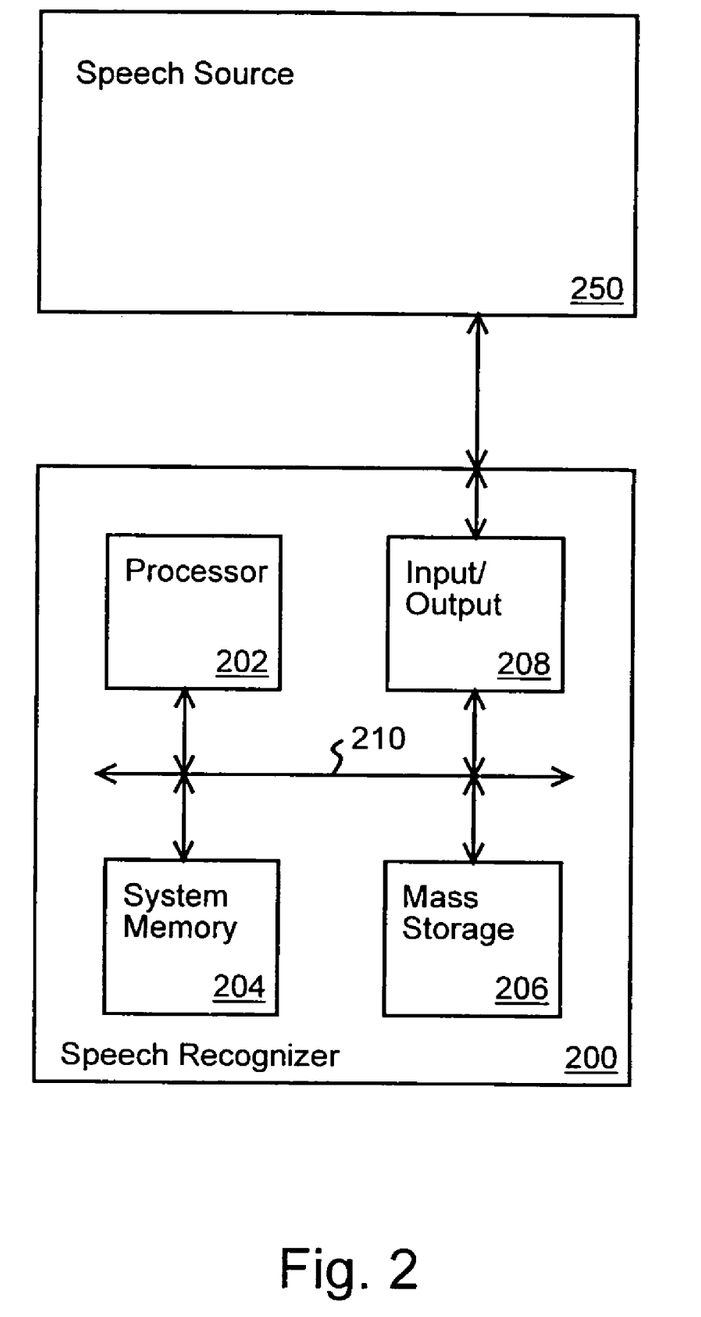
FIG. 2 illustrates a speech recognition system in accordance with the present invention in conjunction with a source of speech.

FIG. 2 illustrates a speech recognition system 200 in accordance with the present invention in conjunction with a source of speech 250. The speech recognition system 200 includes a general purpose processor 202, a system memory 204, a mass storage medium 206, and input/output devices 208, all of which are interconnected by a system bus 210. The processor 202 operates in accordance with machine readable computer software code stored in the system memory 204 and mass storage medium 206 so as to implement the present invention. The input/output devices 208 can include a display monitor, a keyboard and an interface coupled to the source of speech 250 for receiving spoken input therefrom. Though the speech recognizing system illustrated in FIG. 1 is implemented as a general purpose computer, it will be apparent that the speech recognizing system can be implemented so as to include a special-purpose computer or dedicated hardware circuits. In which case, one or more of the hardware elements illustrated in FIG. 1 can be omitted or substituted by another.

The source of speech 250 is, for example, a microphone which converts sound waves into an electrical signal which is provided to the speech recognizing system 200 for recognition. The source of speech 250 can be a telephone system. In which case, a caller's speech is provided to the speech recognizing system 200 for recognition. The speech recognizing system 200 can operate in accordance with a service application program stored in the memory 204 or mass storage 206 which responds to the caller's speech. Alternately, the speech recognizing system 200 operates in conjunction with a service system (not shown). As an example, the service application program can respond to a telephone caller's speech by providing information regarding flight availability and pricing for a particular airline and by allowing the caller to purchase tickets utilizing spoken language and without requiring assistance from an airline reservations clerk. As another example, the service application can respond to the caller's speech by providing banking or other financial services to the caller.

In the preferred embodiment, the service application prompts the caller to respond by answering a series of questions. For example, questions for an airline reservation system can include: "What city do you wish to depart from?"; "What is your desired departure date?"; "What is your desired destination city?"; "On what date do you wish to return?"; and "Do you prefer a window seat or an isle seat?". Examples of questions for a banking system can include: "What is your account number?"; "Do you wish to obtain your account balance, transfer a balance or withdraw funds?"; "What is the amount you wish to transfer?"; and "Do you wish to perform another transaction?". It will be understood, however, that the particular service application program utilized and questions posed are not material to the present invention and that various different service application programs and questions can be utilized in connection with the invention.

Figure 3:
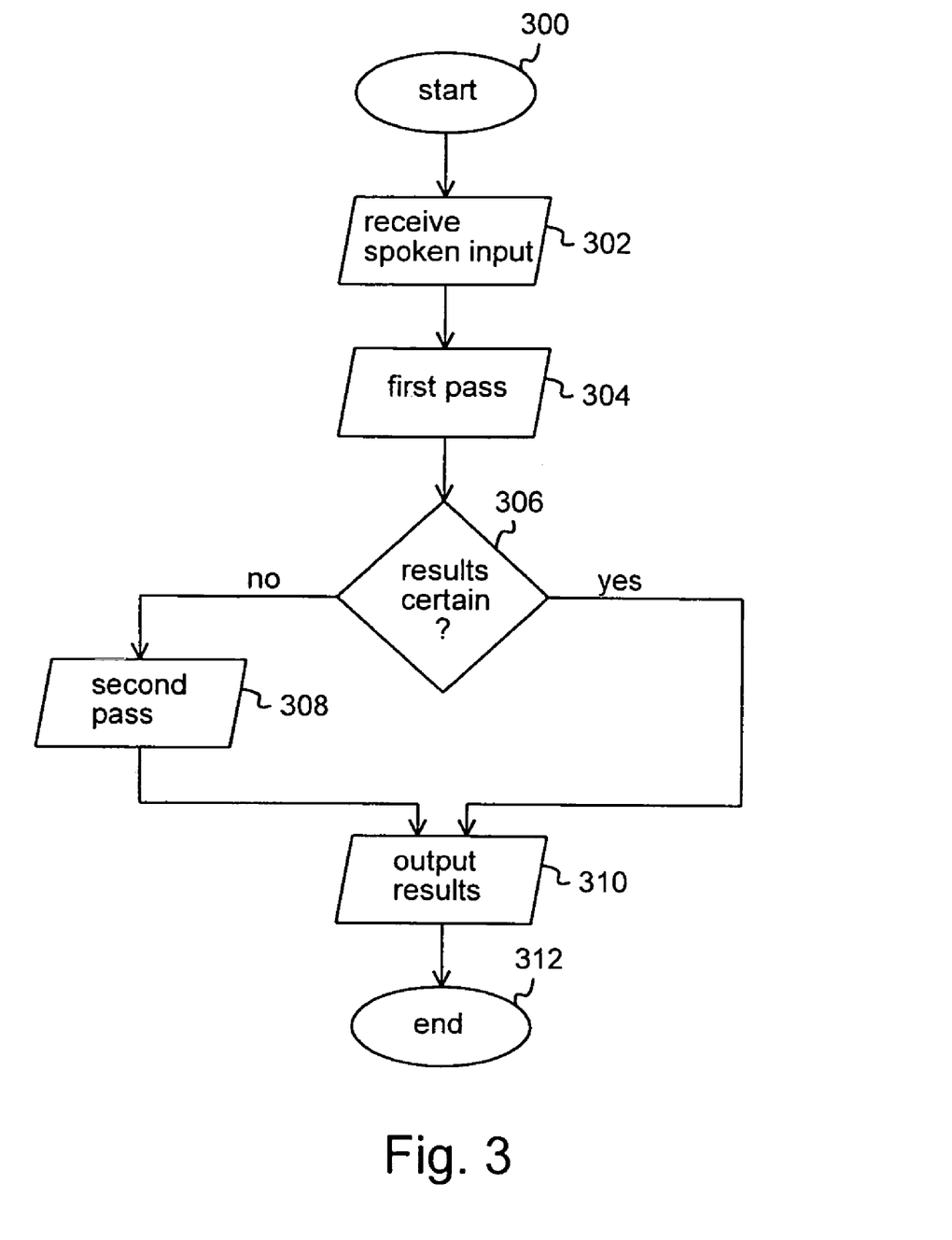
FIG. 3 illustrates a flow diagram for a multi-pass speech recognition system in accordance with the present invention.

The invention is a method and apparatus for an improved multi-pass speech recognition system. FIG. 3 illustrates a flow diagram for a multi-pass speech recognition system (also referred to as a speech recognizer) in accordance with the present invention. The flow diagram of FIG. 3 illustrates graphically operation of the speech recognizing system 200 illustrated in FIG. 2 in accordance with the present invention. Program flow begins in a start state 300. From the state 300, program flow moves to a state 302. In the state 302, the speech recognizing system 200 receives spoken input from the source of speech 250. Then program flow moves to a state 304.

In the state 304, a first pass is made during which the spoken input is processed by the speech recognizing system 200 according to a first speech recognizing technique. In the preferred embodiment, the first pass is performed by the speech recognizing system 200 while the speech is still being received from the source of speech 250. This tends to minimize delay in comparison to performing the first pass after the spoken input is received, though it will be apparent that the first pass can alternately be performed after the spoken input is received.

Program flow moves from the state 304 to a state 306. In the state 306, a determination is made as to whether a score associated with the results of the first pass performed in the state 304 exceeds a predetermined threshold. For example, assuming the technique utilized during the first pass is a stochastic speech recognizing algorithm, a result of this first pass can be a number of alternative speech expressions with each alternative expression having an assigned score. The assigned score is a probability or is related to the probability that the corresponding expression correctly corresponds to the spoken input. As a first example, assume the spoken input is the word "Boston". In which case, the results of the first pass could be a certainty of fifty-five percent (55%) assigned to the expression: "Austin"; a certainty of forty percent (40%) assigned to the alternative expression: "Boston", and a certainty of five percent (5%) assigned to some other expression or expressions. As a second example, assume the spoken input is the words "account balance". In which case, the results of the first pass could be a certainty of ninety-six percent (96%) assigned to the expression: "account balance"; a certainty of two percent (2%) assigned to the alternative expression: "transfer balance"; and a certainty of two-percent (2%) assigned to some other expression or expressions.

It is expected the number of alternative expressions and corresponding scores will vary widely as they will depend upon a number of varying factors. Examples of such factors can include the speaker's pitch, accent, and enunciation, similarities and differences between the phonetic sounds of various spoken words, upon the quality of a telephone connection between the speaker and the voice recognition system 200, and so forth.

In the first example, the results of the first pass are insufficient to correctly identify the spoken input, whereas, in the second example, the results of the first pass are sufficient to identify the spoken input with a certainty of ninety-six percent (96%). These situations are distinguished in the state 306 by comparing the score assigned to the alternative expressions to a predetermined threshold. For example, the predetermined threshold can be set at a certainty of ninety-five percent (95%), though it will be apparent that the predetermined threshold can be set at another level. In the first example, no alternative expression is assigned a certainty of ninety-five percent (95%) or higher. Therefore, the determination made in the state 306 is negative. In which case, program flow moves to a state 308.

Note that the determination made in the state 306 can be based in another manner upon the assigned scores or certainty levels. For example, the determination can include calculation of a difference between the highest score or certainty assigned to an expression during the first pass and the next highest score or certainty assigned to an alternative expression. This calculated difference can then be compared to a predetermined threshold. If the difference exceeds the threshold, then the determination is positive, whereas, if the difference does not exceed the threshold, then the determination is negative.

In the state 308, a second pass is performed during which the spoken input is processed by the speech recognizing system 200 according to a second speech recognizing technique. In the preferred embodiment, the second speech recognizing-technique attempts to correctly match the spoken input to only those alternative expressions which were identified during the first pass as likely candidates. Thus, in the first example, the second pass only attempts to determine whether the spoken input was "Austin" or "Boston". Alternately, the second pass can start from scratch by disregarding the results of the first pass and by performing a speech recognition technique which requires more time than the first pass, but which yields more accurate results. From the state 308, program flow moves to a state 310 where the results of the second pass are outputted. Outputting the results can include forwarding the identified expression to the service application program and can also include affirming to the speaker the identified expression. Program flow then terminates in a state 312.

Returning to the second example, because the expression "account balance" was assigned a certainty of ninety-six percent (96%) as a result of the first pass, performance of a second pass is not likely to result in the identification of an alternate expression which is a more likely candidate. Therefore, it is desirable to simply output the results of the first pass without performing a second pass. This is especially true because the second pass must generally be performed after the spoken input is entirely received. Thus, any delay caused by the second pass contributes directly to delay in outputting the results. For this reason, the invention performs a second pass only when necessary to resolve ambiguities in the results of a first pass. It is expected that most of time (e.g., 75%), the results of the first pass will be sufficiently certain that a second pass is unnecessary. As a result, the average recognition speed is greatly enhanced in comparison to prior systems which always perform a second pass, but without a significant increase in the rate of recognition errors.

Accordingly, in the state 306, the certainties assigned to the alternative expressions are compared to the predetermined threshold of ninety-five percent (95%). Because the expression "account balance" was assigned a certainty of ninety-six percent (96%) the determination made in the state 306 is positive. In which case, program flow moves to a state 314. In the state 314, the expression having the highest assigned certainty as a result of the first pass is outputted. In the example, the expression "account balance" is selected as the output. Program flow then terminates in a state 316.

In sum, the first pass is performed in the state 304 by a simpler technique/recognition system which narrows the possibilities, while the later pass is performed in the state 308 only when necessary and by a more complex technique/recognition system which operates on narrowed possibilities. Because the second pass is performed only when needed, the speech recognition system 200 in accordance with the present invention recognizes speech with a faster average speed for a given accuracy than prior systems.

Figure 4:
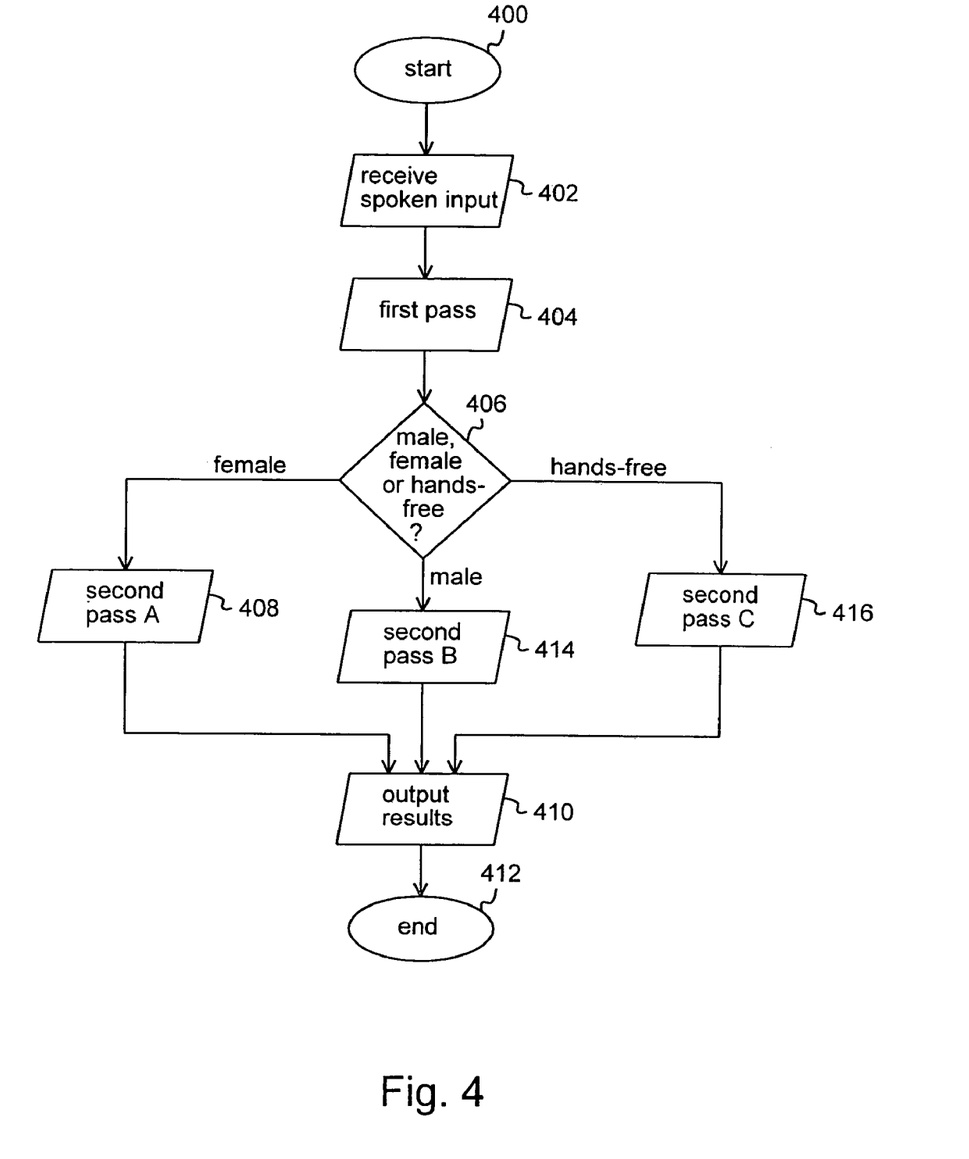
FIG. 4 illustrates a first alternate flow diagram for a multi-pass speech recognition system in accordance with the present invention.

FIG. 4 illustrates a first alternate flow diagram for a multi-pass speech recognition system in accordance with the present invention. The flow diagram of FIG. 4 illustrates graphically operation of the speech recognizing system 200 illustrated in FIG. 2 in accordance with the present invention. Program flow begins in a start state 400. From the state 400, program flow moves to a state 402. In the state 402, the speech recognizing system 200 receives spoken input from the source of speech 250. Then program flow moves to a state 404. In the state 404, a first pass is made during which the spoken input is processed by the speech recognizing system according to a first speech recognizing technique.

Program flow moves from the state 404 to a state 406. In the state 406, a determination is made as to characteristics of the spoken input based upon the results of the first pass. This determination is then utilized to select a most appropriate speech recognition technique (or a most appropriate speech recognizing system) from a plurality of speech recognizing techniques (or speech recognizing systems) for performing a second pass on the spoken input. For example, after the first pass, an attempt can be made to distinguish speakers who are female from speakers who are male. Alternately, after the first pass, an attempt can be made to distinguish the callers channel type. For example the channel type can be callers who are calling from a hands-free type of telephone, callers from a handset type of telephone or callers via some other type of communication device or media which tends to alter the caller's voice in a characterizable manner. Hands-free telephones are also referred to as speaker phones. Still further, after, the first pass, an attempt can be made to distinguish the speaker's accent or dialect. For example, an attempt can be made to determine whether the speaker is speaking English associated with the United Kingdom or the United States, or is speaking with one of the various accents associated with different regions of the United States.

In the preferred embodiment, the spoken input is placed into one of two categories: (1) originating from a female speaker; and (2) originating from a male speaker. The spoken input, however, can be placed into other categories or another number of categories. For example, as shown in FIG. 4, the spoken input can be categorized as one of three categories: (1) originating from a female speaker; (2) originating from a male speaker; and (3) originating from a hands-free telephone where the speaker is female or male.

Assuming the determination made in the state 406 is that the speaker is female, then program flow moves from the state 406 to a state 408. In the state 408, a second pass is performed on the spoken input according to a speech recognition technique which is specifically tailored to perform recognition of speech originating from female speakers. For example, the second pass technique performed in the state 408 can be based upon templates of words or utterances formed by taking samples of speech of women or, in the case of a stochastic technique, upon models formed by taking samples of speech of women. Accordingly, the speech recognition technique performed in the state 408 is specifically tailored to recognize the speech of female speakers (and, preferably, those who are not calling from a hands-free telephone). As a result, the technique can perform speech recognition in less time for a given accuracy in comparison to a technique which is general to all possible speakers or may even result in higher accuracy independent of computation time.

From the state 408, program flow moves to a state 410 where the results of the second pass are outputted. Program flow then terminates in a state 412.

Assuming the determination made in the state 406 is that the speaker is male, then program flow moves from the state 406 to a state 414. In the state 414, a second pass is performed on the spoken input according to a speech recognition technique which is specifically tailored to perform recognition of speech originating from male speakers. Because the speech recognition technique performed in the state 414 is specifically tailored to male speakers (and, preferably, those who are not calling from a hands-free telephone), the technique can perform speech recognition in less time for a given accuracy or with higher accuracy in comparison to a technique which is not so tailored.

From the state 414, program flow moves to a state 410 where the results of the second pass are outputted. Program flow then terminates in a state 412.

Assuming the determination made in the state 406 is that the speaker is a caller from a hands-free telephone, then program flow moves from the state 406 to a state 416. In the state 416, a second pass is performed on the spoken input according to a speech recognition technique which is specifically tailored to perform recognition of speech originating from speakers calling from hands-free telephones. For example, the second pass technique performed in the state 416 can be based upon templates of words or utterances formed by taking samples of speech of persons calling from hands-free telephones or, in the case of a stochastic technique, upon models formed by taking samples of speech of persons calling from hands-free telephones.

Because the speech recognition technique performed in the state 416 is specifically tailored to speakers calling from hands-free telephones, the technique can perform speech recognition in less time for a given accuracy in comparison to a technique which is not so tailored. In addition, this technique performed in the state 416 can be pre-configured to require more processing time or capability than the techniques performed in the second pass states 408 and 414 so as achieve a higher degree of accuracy for hands-free telephones than would otherwise be the case. However, because this second pass technique is performed only when necessary (i.e. when the caller is calling from a hands-free telephone), the average recognition speed is greatly enhanced in comparison to prior systems without a significant increase in the rate of recognition errors.

The first pass can be performed in the state 404 by the speech recognizing system 200 while the spoken input is still being received from the source 250. In addition, the determination made in the state 406 can be performed while the spoken input is still being received. This allows the second pass performed in the state 408, 414 or 416 to begin while the spoken input is still being received. Accordingly, the first pass performed in the state 404 can utilize only a portion of a spoken utterance to determine which second pass recognition technique to use (408, 414, or 416), while the second pass begins while the same utterance continues. For example, the spoken input can be stored in a first-in, first-out buffer as it is being received, beginning at a starting address. The second pass begins by removing the spoken input from the buffer beginning with the starting address while spoken input is still being stored in the buffer. This tends to minimize delay in comparison to performing the first pass or both passes only after the spoken input is received. It will be apparent, however, that the first pass or both passes can be performed after the spoken input is received.

According to an alternate aspect of the present invention illustrated in FIG. 4, multiple selected ones of the speech recognition techniques can be performed in the states 408, 414 and 416 for spoken input prior to outputting the results. Thus, returning to the example above where the spoken input is the word "Boston", assume that a result of the second pass performed in the state 408 is a certainty of seventy-five percent (75%) assigned to the expression: "Boston" and a certainty of thirty-five percent (25%) assigned to the alternative expression: "Austin". In which case, the certainty that the spoken input is correctly recognized is seventy-five percent (75%). Performance of another pass in the state 414 or 416 would likely improve the certainty that the spoken input is.

correctly recognized and reduce the frequency of errors. Accordingly, when the highest score or certainty obtained in one of the states 408, 414 or 416 is below a predetermined threshold (e.g., 80%) another pass is made in one or more of the other states 408, 414, 416.

Thus, returning to the example, because the certainty of seventy-five percent (75%) is lower than the predetermined threshold of eighty percent (80%), program flow moves from the state 408 to the state 414. It will be understood that program flow can move from any of the states 408, 414, or 416 to any other one of the states 408, 414, or 416, as appropriate, though corresponding pathways are not shown in FIG. 4 to avoid obscuring the invention. Once two or more of the techniques of the states 408, 414 and 416 are performed, the certainties are combined and the results outputted based upon the combined certainties. For example, a maximization scheme can be utilized to determine which expression is selected as the output. According to this maximization technique, the expression with the highest assigned score or certainty is selected as the output. In the example, the highest certainty is seventy-five percent (75%) assigned to the expression: "Boston". Accordingly, the term "Boston" is selected as the output. Note that the expression "Boston" would preferably be selected due to its score of seventy-five percent (75%) even if multiple other speech recognition passes selected the expression "Austin" with certainties less than seventy-five percent (75%).

It will be apparent, however, that the evaluation of scores or confidences can be performed according to other mathematical techniques. For example, the alternative expression having the highest average score or certainty can be selected as the output. Returning to the example, assume that a result of the pass performed in the state 414, is a certainty of fifty-five percent (55%) assigned to the expression: "Boston" and a certainty of forty-five percent (45%) assigned to the alternative expression: "Austin". The average certainty assigned to the expression "Boston" in the states 408 and 414 is, therefore, sixty-five percent (65%), whereas, the average certainty assigned to the expression "Austin" in the states 408 and 414 is thirty-five percent (35%). Accordingly, the term "Boston" is selected as the output.

Further, multiple ones of the speech recognition techniques can be selected based upon the results of the first pass performed in the state 404. For example, assume that in the state 406, the results of the first pass are equivocal as to whether or not the speaker is calling from a hands-free telephone. In which case, a pass can be performed according to the technique of state 416 and a pass can be simultaneously performed according to the technique of one or both of the states 408 and 414, as appropriate. The expression which receives the highest combined score or certainty is then selected as the output.

Still further, the first pass performed in the state 404 can output recognized words with their phonetic alignments (where they and their constituent sounds are found in the output) in addition to outputting the words themselves. Then, state 406 would select the second pass technique by applying each second pass on a selected portion of the spoken input based upon the alignments. The second pass recognition technique which obtains a highest score or certainty for the selected portion is then utilized to perform a second pass upon the entire spoken input. The selected portion of the spoken input can be a selected phoneme or multiple selected phonemes, such as corresponding to a particular vowel or vowels. Once an appropriate second pass technique is selected, use of the others can be discontinued. If none of the second pass speech recognition techniques results in a significantly higher score than the others, however, some or all of the second pass recognition techniques (in the states 408, 414, and 416) can be utilized to recognize the entire spoken input and the results combined to obtain the output. Alternatively, second pass techniques can be selected by applying Gaussian Mixture Models (GMMs) specific to each technique to the input speech, where a selected second pass is the one corresponding to the GMM which best matches the input speech.

In addition, the second pass performed in the states 408, 414, or 416 can start from scratch by disregarding the results of the first pass. For example, the results of the first pass could be found to be unreliable (e.g., where the highest score or certainty achieved is extremely low) as may occur if the first pass acoustic model was improper (e.g., the call was placed from a hand-free cellular telephone and the model was based upon land-based, non-hands free samples). A further modification can include omitting the first pass altogether and, instead, determining the characteristics of the spoken input by a supplementary input by the caller. For example, the caller can be prompted to press the number "1"(one) on the keypad of his/her telephone if calling from a hands-free telephone. Alternately, the caller can be prompted to respond verbally to an inquiry regarding his/her telephone channel type.

Figure 5:
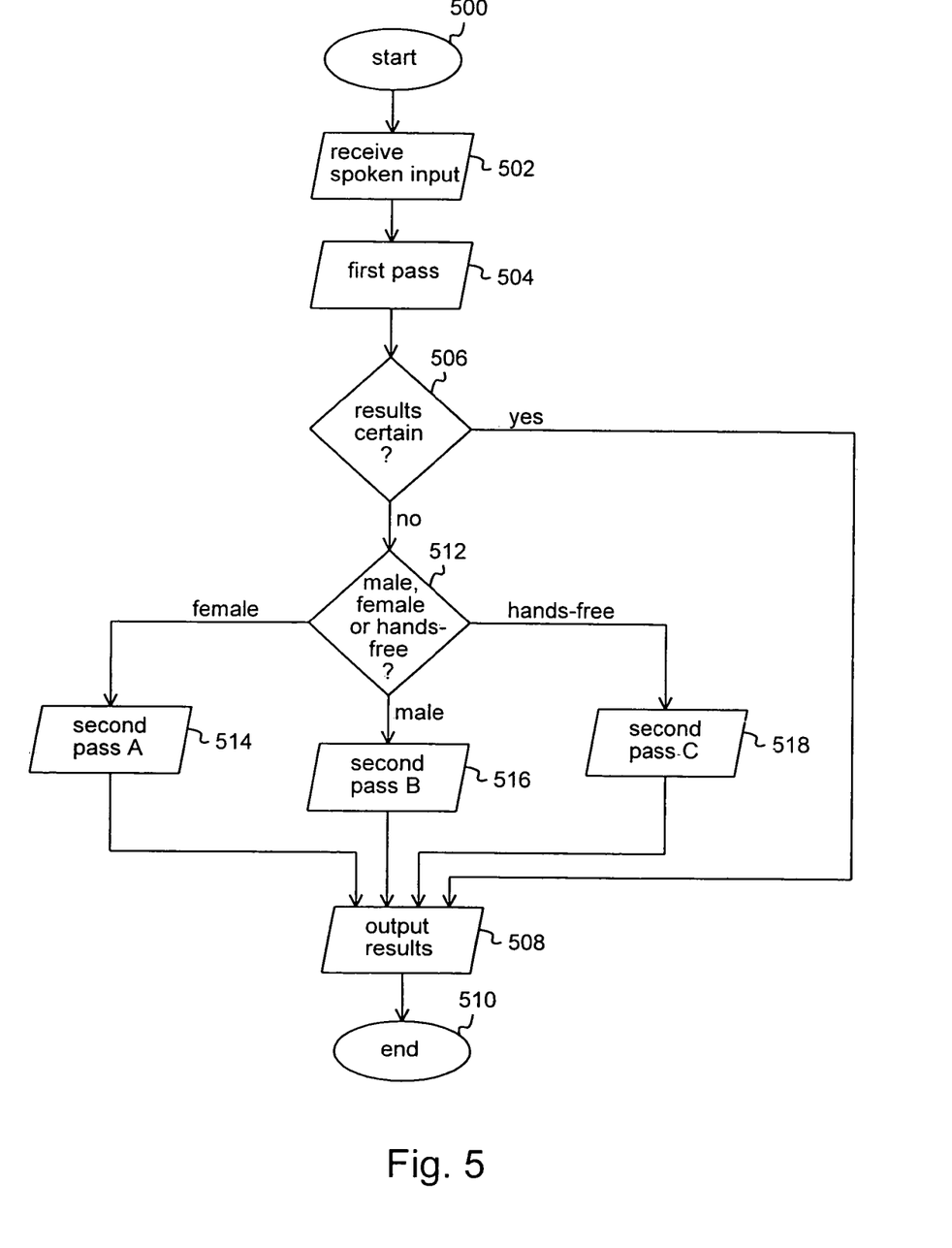
FIG. 5 illustrates a second alternate flow diagram of a multi-pass speech recognition system in accordance with the present invention.

FIG. 5 illustrates a second alternate flow diagram of a multi-pass speech recognition system in accordance with the present invention. The flow diagram of FIG. 5 illustrates graphically operation of the speech recognizing system 200 illustrated in FIG. 2 in accordance with the present invention. Program flow begins in a start state 500. From the state 500, program flow moves to a state 502. In the state 502, the speech recognizing system 200 receives spoken input from the source 250. Then program flow moves to a state 504.

In the state 504, a first pass is made during which the spoken input is processed by the speech recognizing system 200 according to a first speech recognizing technique. In the preferred embodiment, the first pass is performed by the speech recognizing system 200 while the speech is still being received from the source of speech 250. This tends to minimize delay in comparison to performing the first pass after the spoken input is received, though it will be apparent that the first pass can alternately be performed after the spoken input is received.

Program flow moves from the state 504 to a state 506. In the state 506, a determination is made as to whether the score or certainty of the results of the first pass performed in the state 504 exceed a predetermined threshold (e.g., 95%). The determination made in the state 506 can the same as is made in the state 306 described above in reference to FIG. 3. Assuming that the determination made in the state 506 is positive, program flow moves to a state 508. In the state 508, the expression having the highest assigned score or certainty as a result of the first pass is outputted. Program flow then terminates in a state 510.

Assuming, however, that the determination made in the state 506 is negative, then program flow moves to a state 512. In the state 512, a determination is made as to characteristics of the spoken input based upon the results of the first pass. The determination made in the state 512 can be the same as the determination made in the state 406 described above in reference to FIG. 4. This determination is then utilized to select a most appropriate speech recognition technique (or a most appropriate speech recognizing system) from a plurality of speech recognizing techniques (or speech recognizing systems) for performing a second pass on the spoken input. For example, the first pass can include an attempt to distinguish speakers who are female from speakers who are male, callers who are calling from a hands-free type of telephone from a handset type of telephone and/or the particular accent or dialect of the speaker.

In the preferred embodiment, the spoken input is placed into one of two categories: (1) originating from a female speaker; and (2) originating from a male speaker. The spoken input, however, can be placed into other categories or another number of categories. For example, as shown in FIG. 5, the spoken input can be categorized as one of three categories: (1) originating from a female speaker; (2) originating from a male speaker; and (3) originating from a hands-free telephone where the speaker is female or male.

Assuming the determination made in the state 512 is that the speaker is female, then program flow moves from the state 512 to a state 514. In the state 514, a second pass is performed on the spoken input according to a speech recognition technique which is specifically tailored to perform recognition of speech originating from female speakers. From the state 514, program flow moves to the state 508, where the results of the second pass are outputted, and then terminates in the state 510.

Similarly, assuming the determination made in the state 512 is that the speaker is male, then program flow moves from the state 512 to a state 516. In the state 516, a second pass is performed on the spoken input according to a speech recognition technique which is specifically tailored to perform recognition of speech originating from male speakers. From the state 516, program flow moves to the state 508, where the results of the second pass are outputted, and then terminates in the state 510.

Assuming the determination made in the state 512 is that the speaker is a caller from a hands free telephone, then program flow moves from the state 512 to a state 518. In the state 518, a second pass is performed on the spoken input according to a speech recognition technique which is specifically tailored to perform recognition of speech originating from hands-free telephone callers. From the state 518, program flow moves to a state 508, where the results of the second pass are outputted, and then terminates in the state 510.

In the preferred embodiment, the first pass is performed in the state 504 by the speech recognizing system 200 while the spoken input is still being received from the source 250. The determinations made in the states 506 and 512, however, are preferably performed after the spoken input is received. It will be apparent, however, that the determinations made in the states 506 and 512 may be made while the spoken input is still being received. According to another aspect of the present invention illustrated in FIG. 5, multiple selected ones of the speech recognition techniques can be performed in the states 514, 516 and 518 for spoken input prior to outputting the results. Thus, selected multiple ones of the speech recognition techniques can be performed based upon the results of the first pass performed in the state 504. For example, when the result of the decision made in the state 512 is equivocal as to whether or not the speaker is calling from a hands-free telephone, a pass can be made according to the technique of state 518 and a pass can also be made according to the technique of one or both of the states 514 and 516. The expression which receives the highest maximum score or certainty is then selected as the output.

Alternately, when the highest score or certainty obtained in one of the states 514, 516 and 518 is below a predetermined threshold (e.g., 80%) another pass is made in one or more of the other states 514, 516 and 518. As an example, program flow can move from the state 514 to the state 516 when the results of the state 514 are below the predetermined threshold.

It will be understood that program flow can move from any of the states 514, 516 and 518 to any other one of the states 514, 516 and 518, as appropriate, though corresponding pathways are not shown in FIG. 5 to avoid obscuring the invention. Once two or more of the techniques of the states 514, 516 and 518 are performed, the score or certainties are combined and the results outputted based upon the combined scores or certainties.

As illustrated in FIG. 5, a first pass can be performed (in the state 504), and if the first pass identifies the spoken input with a desired degree of accuracy (e.g., determined by comparing a certainty assigned to alternative speech expressions to a predetermined threshold), then no additional passes need be performed. However, if the first pass does not identify the spoken input with the desired degree of accuracy, then one or more later passes can be selectively performed where the selection is based upon the amount of information the first pass provides regarding the characteristics of the spoken input. These characteristics can include whether the spoken input is originated by a female speaker, a male speaker or a caller from a hands-free telephone. As a result, speech recognition processing capability of the speech recognition system 200 is selectively allocated as needed. This selection can be performed while the spoken input is being processed (i.e. the processing capability is allocated "on-the-fly"). In comparison to prior systems, the invention reduces the average time taken to recognize spoken input while maintaining a high degree of accuracy. By adjusting the various thresholds utilized for selecting the additional passes, the speech recognizing system 200 can be precisely tailored to provide the desired trade-off between speed and accuracy.

Figure 6:
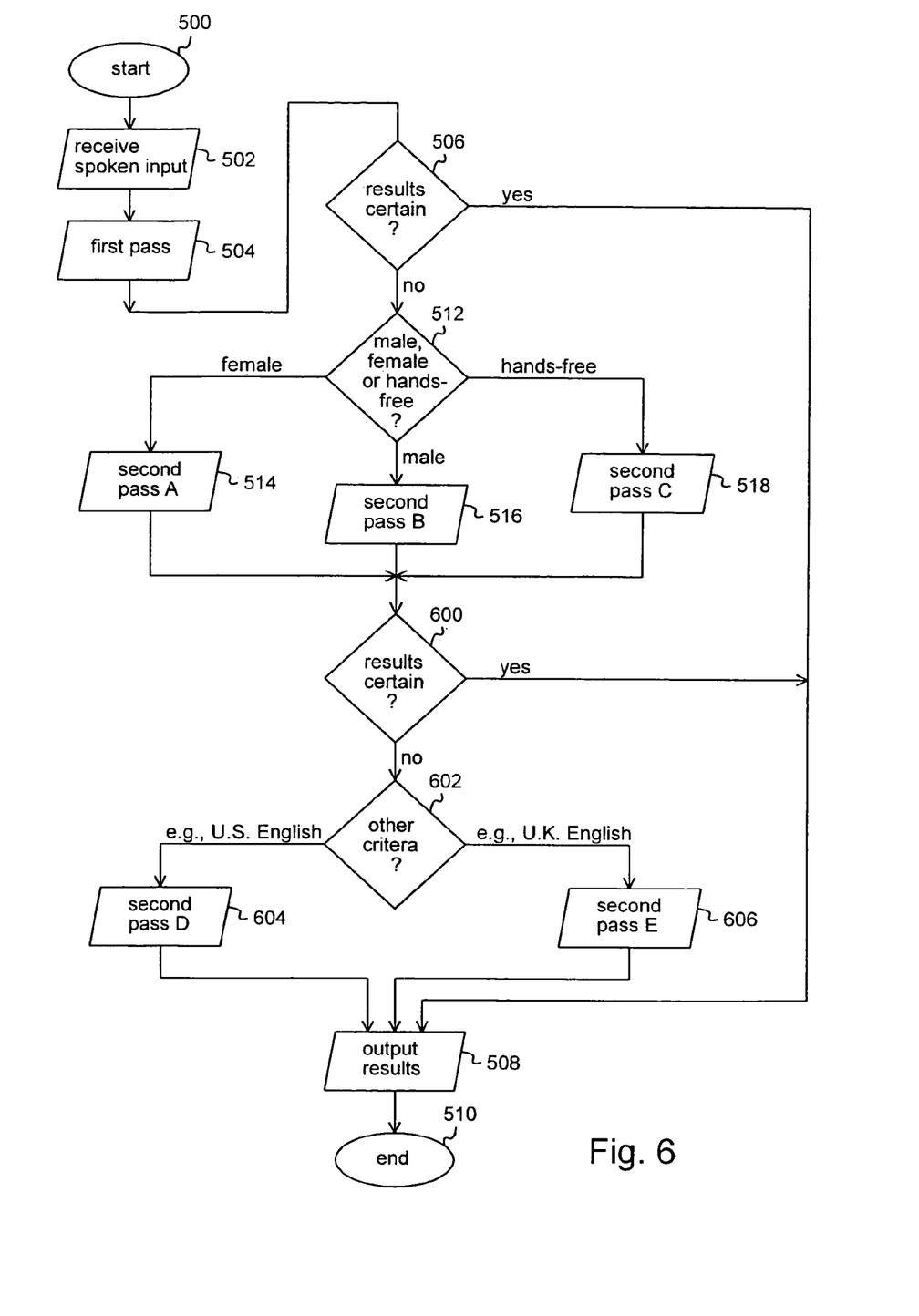
FIG. 6 illustrates a third alternate flow diagram of a multi-pass speech recognition system in accordance with the present invention.

FIG. 6 illustrates a third alternate flow diagram of a multi-pass speech recognition system in accordance with the present invention. The flow diagram of FIG. 6 illustrates graphically operation of the speech recognizing system 200 illustrated in FIG. 2 in accordance with the present invention. Portions of FIG. 6 which have a one-to-one functional correspondence with those of FIG. 5 are given the same reference numeral and are not discussed further.

Referring to FIG. 6, from the state 514, 516 or 518 program flow moves to a state 600 where a determination is made as to whether the results of the second pass performed in these states are sufficiently definite. Thus, the state 600 performs the same function as the state 306 (FIG. 3) and 506 (FIGS. 5-6). Assuming the results are certain, no additional pass need be performed. Accordingly, program flow moves from the state 600 to the state 508 where the results are outputted and, then, program flow terminates in the state 510.

If the results of the second pass are not sufficiently definite, yet another pass can be performed. In the preferred embodiment, this additional pass is performed utilizing a speech recognition technique/system tailored to characteristics other than those utilized during the prior passes. As an example, the additional pass can be performed according to the accent or dialect of the speaker. It will be apparent, however, that the additional pass can be selected according to other characteristics.

Thus, from the state 600, program flow moves to the-state 602. In the state 602, the results of one or more of the prior passes are utilized to determine which speech recognition technique/system to utilize next. In the example, the results of the prior passes can be used to determine whether the speech is in accordance with English spoken in the United Kingdom or in the United States. Assuming that it is determined that the speech is United Kingdom English, then program flow moves to a state 604 where a speech recognition technique/system specifically tailored to United Kingdom English is utilized.

Alternately, program flow moves to the state 606 where a speech recognition technique/system specifically tailored to United States English is utilized. From either the state 604 or 606, program flow moves to the state 508 where the results are outputted. Then, program flow terminates in the state 510.

Therefore, as illustrated in FIG. 6, one, two or more speech recognition passes are selectively performed according to results of a prior pass.

As a modification to the invention illustrated in FIGS. 2-6, silence chopping can be utilized to reduce the amount of input to the second pass or subsequent passes. Thus, based upon the phonetic alignments determined by the first pass, the second pass speech recognition technique does not process at least some portions of the spoken input which are aligned to silence. As a result, periods of silence between speech utterances are omitted from the second pass processing. In order to avoid chopping off the beginning or end of speech utterances, a margin can be employed before and after each utterance which results in the processing of a small amount of silence before and after each utterance. Silence chopping is preferred so as to reduce the processing and, thus, the time, required by the second or subsequent passes.

As another modification to the invention illustrated in FIGS. 2 and 4-6, the first pass can be omitted for a sentence based upon the results of a first or later pass performed on a prior sentence. For example, if a prior utterance during a call is from a male speaker, then the next utterance would also be expected to be from a male speaker. Alternately, the model utilized for the first pass can be varied (e.g. selected from a plurality of possible speech recognition techniques) based upon prior utterances. For example, if the speaker of prior utterances to determined to be female, then the first pass can be tailored to female speakers. If the results suddenly worsen, this would indicate that a change in the speech recognition model is needed, as would occur if the female speaker handed the phone to a male speaker.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A speech recognition system for recognizing spoken input received from a source of the spoken input coupled to the speech recognition system, the speech recognition system comprising:
   a. input means for receiving the spoken input from the source of the spoken input; and
   b. processing means coupled to the input means for performing a first pass speech recognition technique on the spoken input and for forming first pass results;
wherein the processing means selectively performs a second pass speech recognition technique on the spoken input according to the first pass results, first pass results include alignments of speech and silence of the spoken input, and further wherein when the second pass speech recognition technique is performed, the second pass speech recognition technique does not process at least some portions of the spoken input which are aligned to silence.

2. The speech recognition system according to claim 1, wherein the processing means employs a margin of silence before and after each utterance of the spoken input.

3. A speech recognition system for recognizing spoken input received from a source of the spoken input coupled to the speech recognition system wherein the speech recognition system comprises:
   a. input means for receiving the spoken input from the source of the spoken input: and
   b. processing means coupled to the input means for performing a first pass speech recognition technique on the spoken input and for forming first pass results:
wherein the processing means selectively performs a second pass speech recognition technique on the spoken input according to the first pass results, the first pass results identify an alignment of speech and silence associated with the spoken input, and further a plurality of speech recognition techniques are performed on a selected portion of the spoken input wherein the selected portion is selected based upon the alignment associated with the spoken input, wherein the second pass speech recognition technique does not process at least some portions of the spoken input which are aligned with silence.

4. The speech recognition system according to claim 3, wherein the selected portion of the spoken input is a phoneme.

5. The speech recognition system according to claim 3, wherein each of the plurality of speech recognition techniques forms a score corresponding to the selected portion of the spoken input.

6. The speech recognition system according to claim 5, wherein the second pass speech recognition technique is a selected one of the plurality of speech recognition techniques having a highest corresponding score.

7. A method of recognizing spoken input received from a source of the spoken input wherein the method comprises steps of:
   a. receiving the spoken input from the source of the spoken input:
   b. performing a first pass speech recognition technique on the spoken input;
   c. forming first pass results; and
   d. selectively performing a second pass speech recognition technique on the spoken input according to the first pass results;
wherein the first pass results include alignments of speech and silence of the spoken input and wherein when the second pass speech recognition technique is performed, the second pass speech recognition technique does not process at least some portions of the spoken input which are aligned to silence.

8. The method according to claim 7, wherein the first past results include a margin of silence employed before and after each utterance of the spoken input.

9. A method of recognizing spoken input received from a source of the spoken input wherein the method comprises steps of:
   a. receiving the spoken input from the source of the spoken input;
   b. performing a first pass speech recognition technique on the spoken input;
   c. forming first pass results; and
   d. selectively performing a second pass speech recognition technique on the spoken input according to the first pass results;
wherein the first pass results identify an alignment of speech and silence associated with the spoken input, and further a plurality of speech recognition techniques are performed on a selected portion of the spoken input is selected based upon the alignment associated with the spoken input, wherein the second pass speech recognition technique does not process at least some portions of the spoken input which are aligned with silence.

10. The method according to claim 9, wherein the selected portion of the spoken input is a single phoneme.

11. The method according to claim 9, wherein each of the plurality of speech recognition techniques forms a score corresponding to the selected portion of the spoken input.

12. The method according to claim 11, wherein the second pass speech recognition technique is a selected one of the plurality of speech recognition techniques having a highest corresponding score.

* * * * *